May 6, 1924.

H. J. BARTENBACH ET AL

TREAD ATTACHMENT FOR WHEELS

Filed Dec. 27, 1922   3 Sheets-Sheet 1

1,492,876

Inventor
Henry J. Bartenbach,
H. Grotzky.

By Lacy & Lacy, Attorneys

May 6, 1924.
H. J. BARTENBACH ET AL
1,492,876
TREAD ATTACHMENT FOR WHEELS
Filed Dec. 27, 1922   3 Sheets-Sheet 2
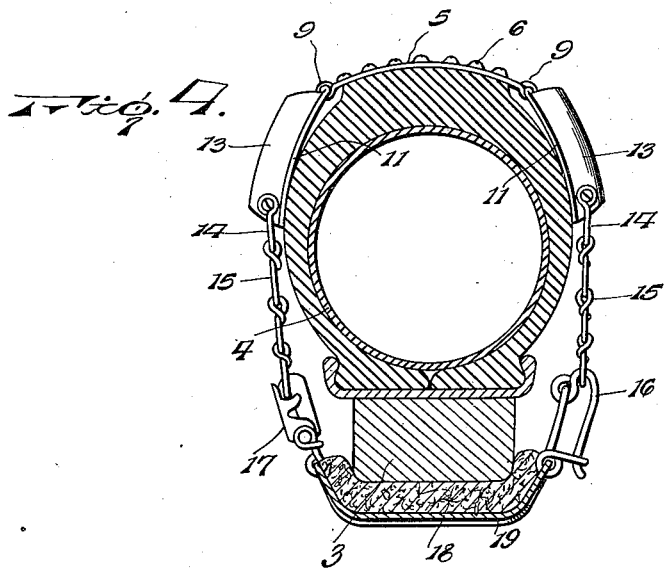
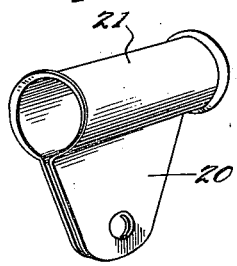
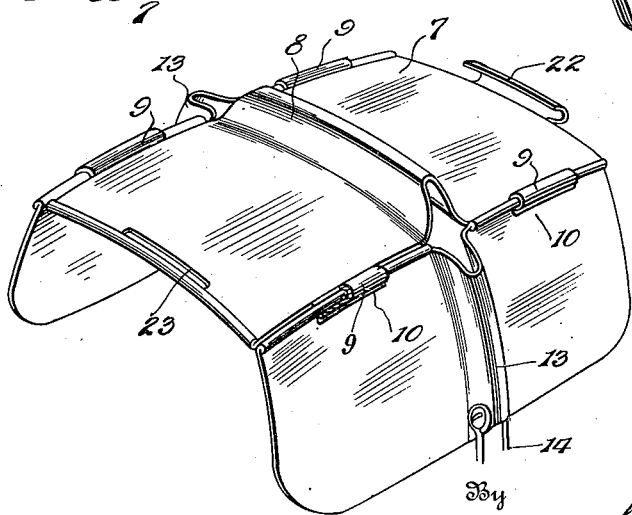
Inventor
Henry J. Bartenbach.
H. Grotzky.
By
Lacey & Lacey, Attorneys May 6, 1924.

H. J. BARTENBACH ET AL

TREAD ATTACHMENT FOR WHEELS

Filed Dec. 27, 1922    3 Sheets-Sheet 3

Inventors
Henry J. Bartenbach
Hugo Grotzky

By *Lacy & Lacy*, Attorneys

Patented May 6, 1924.

1,492,876

UNITED STATES PATENT OFFICE.

HENRY J. BARTENBACH AND HUGO GROTZKY, OF GRAND ISLAND, NEBRASKA.

TREAD ATTACHMENT FOR WHEELS.

Application filed December 27, 1922. Serial No. 609,231.

*To all whom it may concern:*

Be it known that we, HENRY J. BARTENBACH and HUGO GROTZKY, citizens of the United States, residing at Grand Island, in the county of Hall and State of Nebraska, have invented certain new and useful Improvements in Tread Attachments for Wheels, of which the following is a specification.

This invention relates to means for preventing skidding of wheels equipped with pneumatic or other smooth tread tires. The invention has for its object the provision of means which may be readily applied to or removed from a tire and which, when applied, will effectually prevent skidding of the wheel in soft or slippery ground. The invention is illustrated in the accompanying drawings and consists in certain novel features which will be particularly pointed out in the claims following a detailed description.

In the drawings—

Fig. 4 is a transverse section of a tire and wheel rim, having the invention applied thereto;

Fig. 5 is a detail perspective view of a holding member employed in the form of the invention shown in Fig. 2;

Fig. 6 is a detail perspective view, partly broken away, showing a tread plate differing somewhat from the tread plate shown in Fig. 3;

Figure 1:
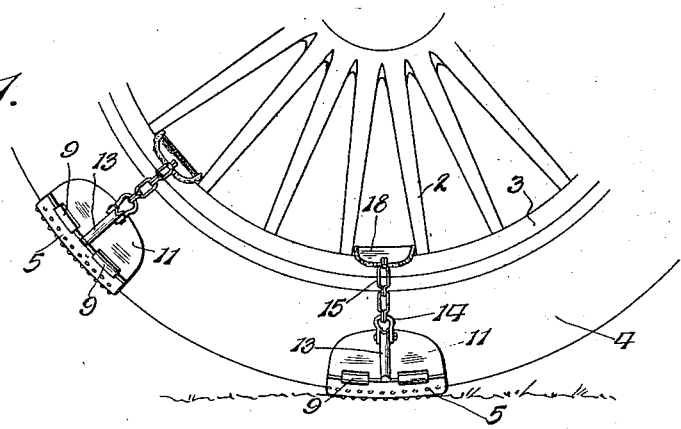
Figure 1 is a side elevation of a portion of a wheel having one embodiment of our invention applied thereto.

In the drawings, the reference numeral 1 indicates a portion of a hub, 2 indicates spokes, 3 indicates a felly, and 4 indicates a pneumatic tire, all of which parts may be of any well-known or preferred construction.

Figure 3:
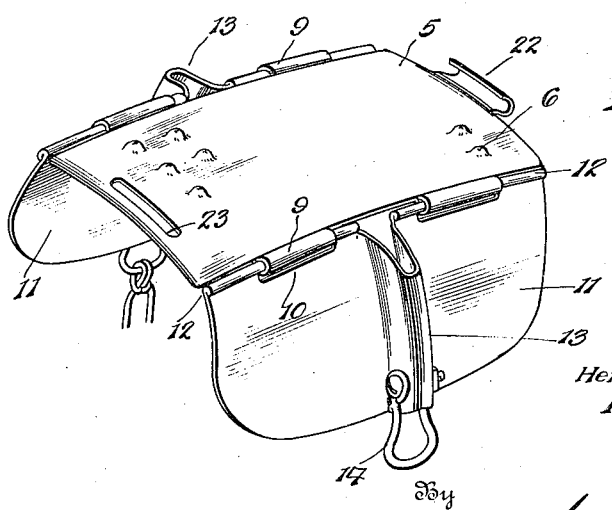
Fig. 3 is a detail perspective view of one tread section or shoe.

In carrying out the invention, we employ a shoe or tread plate 5 which is of arcuate form both transversely and longitudinally so as to conform to the curvature of the tread surface of the tire. In the form of the invention illustrated more particularly in Fig. 3, this tread plate or shoe is equipped with teeth or spurs 6 struck up from its ground-engaging surface and extending over its entire area in spaced relation and adapted to engage the surface of the road over which the wheel is traveling and thereby obtain a good effective traction engagement between the wheel and the road. These teeth or spurs 6 project only slightly beyond the surface of the shoe so that they are particularly adapted for use upon paved roads which may be covered with sleet and will prevent skidding of the wheel without injuring the roadway. For use upon soft muddy or sandy roads, we employ the shoe or tread plate 7, shown more particularly in Fig. 6. This tread plate is of the same general form as the tread plate 5 but, instead of having the spurs or teeth 6, is equipped or formed centrally with a transverse rib 8 which may be conveniently produced by striking up the material of the shoe in substantially U form, as shown in Fig. 6. This rib will, of course, enter the muddy or sandy surface to a sufficient extent to furnish the wheel with an effective purchase and at the same time it will prevent undue twisting movement of the wheel.

In both forms, it will be noted, the shoe is provided at its side edges with grooves or rolled lips or hooks 9 which constitute hinge members to engage in slots or notches 10 formed in the inner edges of side plates or wings 11, the material of said plates or wings at the inner side edges thereof being rolled, as shown at 12, to form beads or eyes which extend across the open sides of the notches and are engaged with the hooks 9 so as to be retained therein. The side plates or wings may thus be readily disposed at the proper angle to fit against the sides of the tires and these members are provided centrally with the transverse ribs 13 which will aid in preventing skidding in very soft ground and at the same time furnish attaching members to which the end links 14 of chains 15 may be attached. The chains 15 extend to the sides of the felly 3 and, in the form of the invention shown more particularly in Figs. 1 and 4, are engaged by latches 16 and 17 carried by the opposite sides of a felly-engaging base or clamping plate 18. As shown most clearly in Fig. 4, the plate 18 is substantially U-shaped in cross section so as to conform to the felly 3 and upon its outer face is provided with a pad or cushion 19 whereby marring of the felly is prevented. This pad or cushion, furthermore, by its frictional engagement with the felly will tend to prevent slipping of the base or clamping plate and owing to its yielding qualities will permit the chains 15 to be drawn taut so as to hold the tread members firmly against the tire. The form of the invention employing the base clamping plate 18 may conveniently be used in cities or upon paved roads where skidding will be effectually prevented if the shoes are provided at intervals, as shown in Fig. 1, and it will be noted that the plate passes between the spokes of the wheel which will prevent the plate slipping circumferentially of the wheel even if it should not be clamped as tightly as possible.

Figure 2:
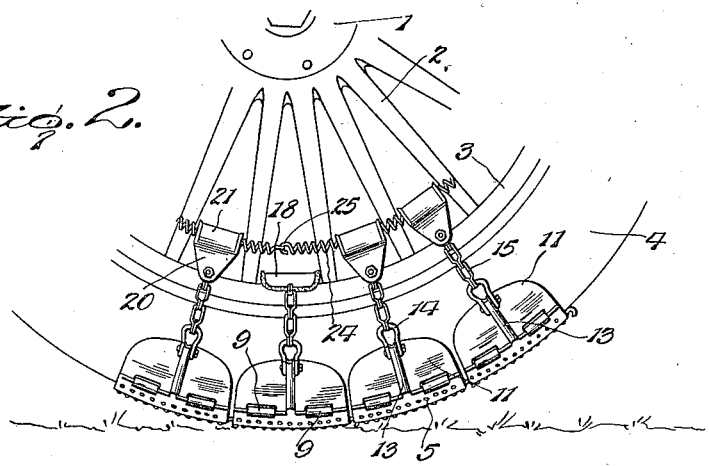
Fig. 2 is a similar view showing another adaptation of the invention.

It is desirable at times to provide the entire circumferential area of the tire with the traction afforded by the tread plates or shoes and in such event, we employ the form of the invention shown in Fig. 2. In this form of the invention, the tread plates are employed in such number as to cover the entire circumference of the tire and lie close together thereon. The base or clamping plate 18 with the pad or cushion 19 thereon is employed at intervals and in the intervening spaces the chains 15 are secured to tabs 20 projecting from sleeves 21. As shown in Fig. 2, the tread members are arranged so as to extend entirely around the circumference of the wheel and they are flexibly connected by having a transverse hook 22 at one end of each shoe or tread plate engaged in a transverse slot 23 at the meeting end of an adjacent tread plate or shoe. The tubes or sleeves 21 will be disposed at the opposite sides of the wheel and will form a circular series concentric with the wheel. Through these sleeves or tubes, we insert a coiled spring 24 of such length as to pass through the entire series of sleeves or tubes and have its ends joined, as shown at 25. The spring will, of course, be put under tension when it is inserted through these sleeve members and by its tension will draw them toward the hub of the wheel so that the shoes or tread plates will be held in close engagement with the tire.

Figure 7:
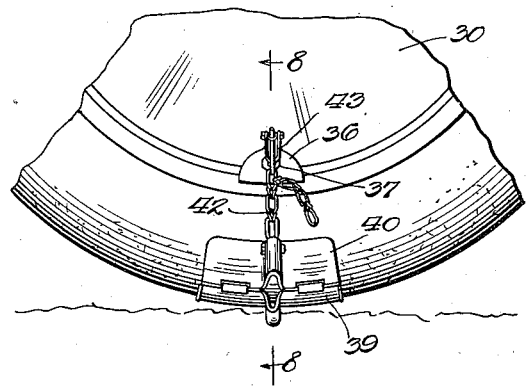
Fig. 7 is a side elevation of a portion of a disk having our invention applied thereto.
Figure 8:
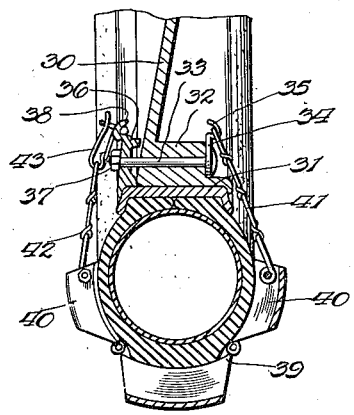
Fig. 8 is an enlarged cross section on the line 8—8 of Fig. 7.

In Figs. 7 and 8, we show the invention applied to a disk wheel 30 having a demountable rim 31. The disk is provided on its inner side with an enlargement or lug 32 through which is inserted a bolt 33, the head of the bolt holding a plate 34 against the side of the lug or enlargement. The plate 34 is provided with a hook 35 which projects radially inward beyond the lug and has its bill presented toward the disk. The end of the bolt passes through a block or plate 36 and a nut 37 is turned home against said block to clamp the same against the outer side of the disk and the rim. The block 36 is equipped with a hook 38 having its bill presented toward the disk. The tread plate 39 may be of the form shown in Fig. 3 or the form shown in Fig. 6 and is provided with side wings 40 corresponding to the wings 11, being fitted over the tire in the manner described in connection with Figs. 1 and 2. A chain or other flexible connection 41 is attached to one side wing 40 and engaged over the hook 35, while a similar flexible connection 42 is secured to the other wing 40 and has one link engaged in a lever latch 43, corresponding to the latch 16, so that, when the latch is closed, both connections will be drawn taut and the tread shoe held firmly to the tire.

Figure 9:
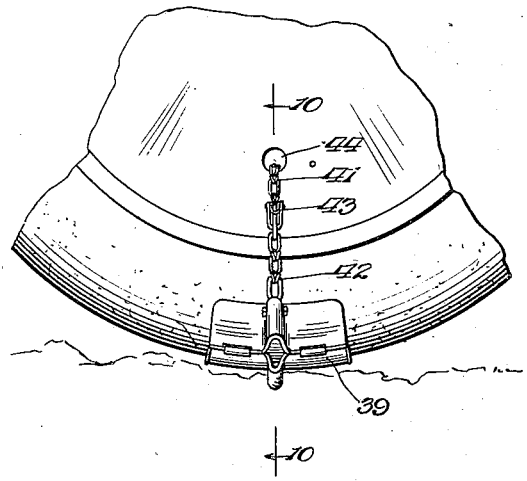
Fig. 9 is a view, similar to Fig. 7, showing another embodiment of the invention.
Figure 10:
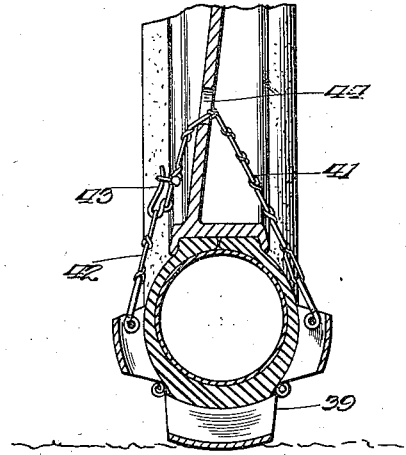
Fig. 10 is an enlarged cross section on the line 10—10 of Fig. 9.

In Figs. 9 and 10, we show the same tread plate 39 applied to another form of disk wheel. The disk is provided with an opening 44 therethrough and the chain or other connection 41 is lengthened so that its free end may be passed through said opening and engaged with the latch 43 which is carried by the connection 42. When the latch is closed, both chains will be drawn taut, and the tread plate will be secured in place.

In all described forms of the invention, the fastening means may be very readily released so that the tread plates and the parts connected therewith may be removed from the wheel while, during the time the tread plates are in use upon the wheel, they will be effectually held in the position in which they are set. The device is very simple in the construction and arrangement of its parts and may be easily applied to a wheel of any size.

Having thus described the invention, what is claimed as new is:

1. An anti-skidding attachment for wheels comprising a tread plate, ground-engaging means upon the tread plate, wings hingedly connected with the side edges of the tread plate, medial transverse ribs struck from the outer sides of the wings and adapted to engage the ground, and means attached to said ribs at the free edges of the wings for securing the tread plate and the wings upon a tire.

2. An anti-skidding attachment for wheels comprising a tread plate adapted to bear against the tread surface of a tire, wings hinged to the tread plate and adapted to bear against the sides of a tire, flexible connecting devices attached to said wings, a U-shaped clamping plate adapted to extend across a wheel felly between the wheel spokes, a cushion on the concave face of said plate bearing upon the felly, and means on the sides of the clamping plate to engage the said flexible connecting devices.

3. An anti-skidding attachment for wheels comprising a series of tread plates extending circumferentially over a tire, flexible connections between adjacent tread plates, wings hingedly attached to the sides of the several tread plates, flexible connecting devices extending from said wings at the sides of the tire, sleeves attached to the inner ends of said devices, and coiled springs disposed at the opposite sides of the wheel and each passed through the series of sleeves at its side of the wheel and having its ends connected.

In testimony whereof we affix our signatures.

HENRY J. BARTENBACH. [L. S.]
HUGO GROTZKY. [L. S.]